(12) United States Patent
Fu et al.

(10) Patent No.: US 8,532,841 B2
(45) Date of Patent: Sep. 10, 2013

(54) REHABILITATION DEVICE

(71) Applicant: National Taiwan University, Taipei (TW)

(72) Inventors: Li-Chen Fu, Taipei (TW); Hung-Yu Lin, Taipei (TW); Christopher Young, Taipei (TW); Jia-Yuan Yu, Taipei (TW)

(73) Assignee: National Taiwan University, Taipei (TW)

( * ) Notice: Subject to any disclaimer, the term of this patent is extended or adjusted under 35 U.S.C. 154(b) by 0 days.

(21) Appl. No.: 13/711,556

(22) Filed: Dec. 11, 2012

(65) Prior Publication Data

US 2013/0103226 A1      Apr. 25, 2013

Related U.S. Application Data

(63) Continuation-in-part of application No. 12/703,923, filed on Feb. 11, 2010, now abandoned.

(30) Foreign Application Priority Data

Nov. 17, 2009   (TW) ............................... 98138965 A

(51) Int. Cl.
*A61H 3/04*         (2006.01)

(52) U.S. Cl.
USPC ................................ 701/1; 135/67; 601/34

(58) Field of Classification Search
USPC ................. 701/1; 135/67, 65, 66, 77, 84, 85; 601/34–36, 5, 26; 482/51, 66, 8; 280/47.34; 367/118; 73/379.08; 177/244; 702/41
See application file for complete search history.

(56) References Cited

U.S. PATENT DOCUMENTS

| | | | | |
|---|---|---|---|---|
| 7,204,328 | B2* | 4/2007 | LoPresti | 180/6.5 |
| 7,398,791 | B2* | 7/2008 | Tucker | 135/66 |
| 2003/0076067 | A1* | 4/2003 | Ashmore et al. | 318/662 |

* cited by examiner

*Primary Examiner* — Marthe Marc-Coleman

(57) ABSTRACT

A rehabilitation device includes a moving body, a motor, a control system and a sensor module. The moving body has a housing and a moving mechanism. The motor, disposed in the housing, connects to the moving mechanism and drives the moving mechanism. The control system is disposed in the housing and coupled to the motor. The sensor module is disposed on the moving body and coupled to the control module. The control system controls the operation of the motor to move the moving body according to information detected by the sensor module.

21 Claims, 6 Drawing Sheets

REHABILITATION DEVICE

CROSS REFERENCE TO RELATED APPLICATIONS

This application is a Continuation-In-Part of U.S. patent application Ser. No. 12/703,923, filed Feb. 11, 2010 and entitled "Rehabilitation device", now abandoned which claims priority of Taiwan Patent Application No. 098138965, filed on Nov. 17, 2009, the entirety of which is incorporated by reference herein.

BACKGROUND OF THE INVENTION

1. Field of the Invention

The present invention relates to a rehabilitation device, an in particular, to a rehabilitation device functioning to assist walking.

2. Description of the Related Art

Conventional walking assistant devices comprise crutches and walkers. Users, usually use the walking assistant devices with their hands or arms for support during mobility. However, due to the manual lifting and positioning required, generally, conventional walking assistant devices are difficult for users to operate. Additionally, because conventional walking assistant devices are passive devices, application by users with special needs, such as for rehabilitation therapy after injury or surgery or assistance with walking posture, may not always be appropriate, resulting in poor results.

BRIEF SUMMARY OF THE INVENTION

Accordingly, the present invention provides a rehabilitation device comprising a moving body, a motor, a control system and a sensor module. The moving body has a housing and a moving mechanism. The motor, disposed in the housing, connects to the moving mechanism and drives the moving mechanism. The control system is disposed in the housing and coupled to the motor. The sensor module is disposed on the moving body and coupled to the control module. The control system controls the operation of the motor to move the moving body according to information detected by the sensor module.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
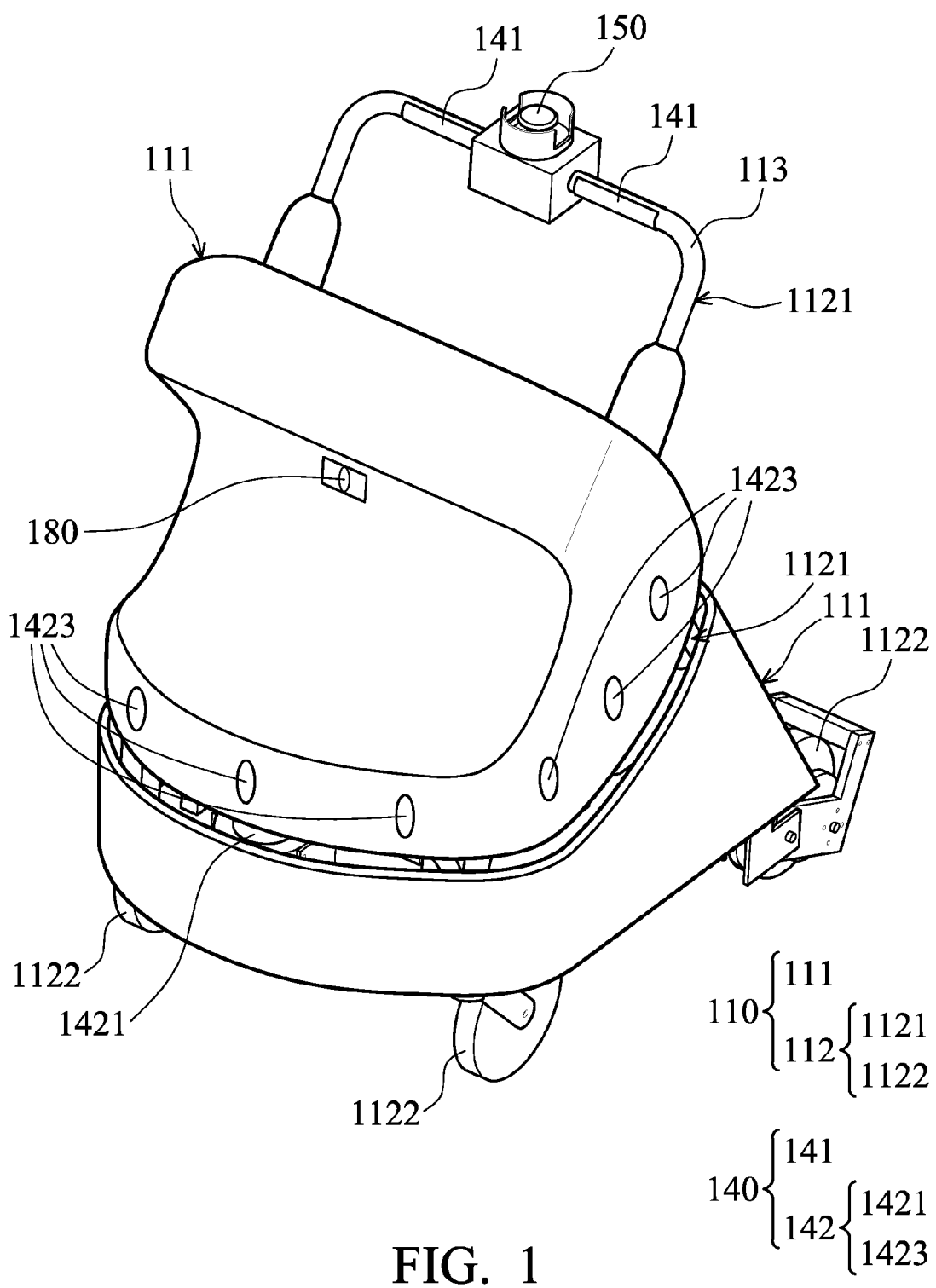
FIG. 1 is a schematic view showing a front side of the rehabilitation device of the invention.

Referring to FIGS. 1 to 4, the rehabilitation device 100 of the invention may provide walking assistance for users during rehabilitation therapy. The rehabilitation device 100 comprises a moving body 110, two motors 120, a control system 130, a sensor module 140, a switch member 150, a power supply unit 160, an operating interface 170 and an illuminating apparatus 180.

Figure 3:
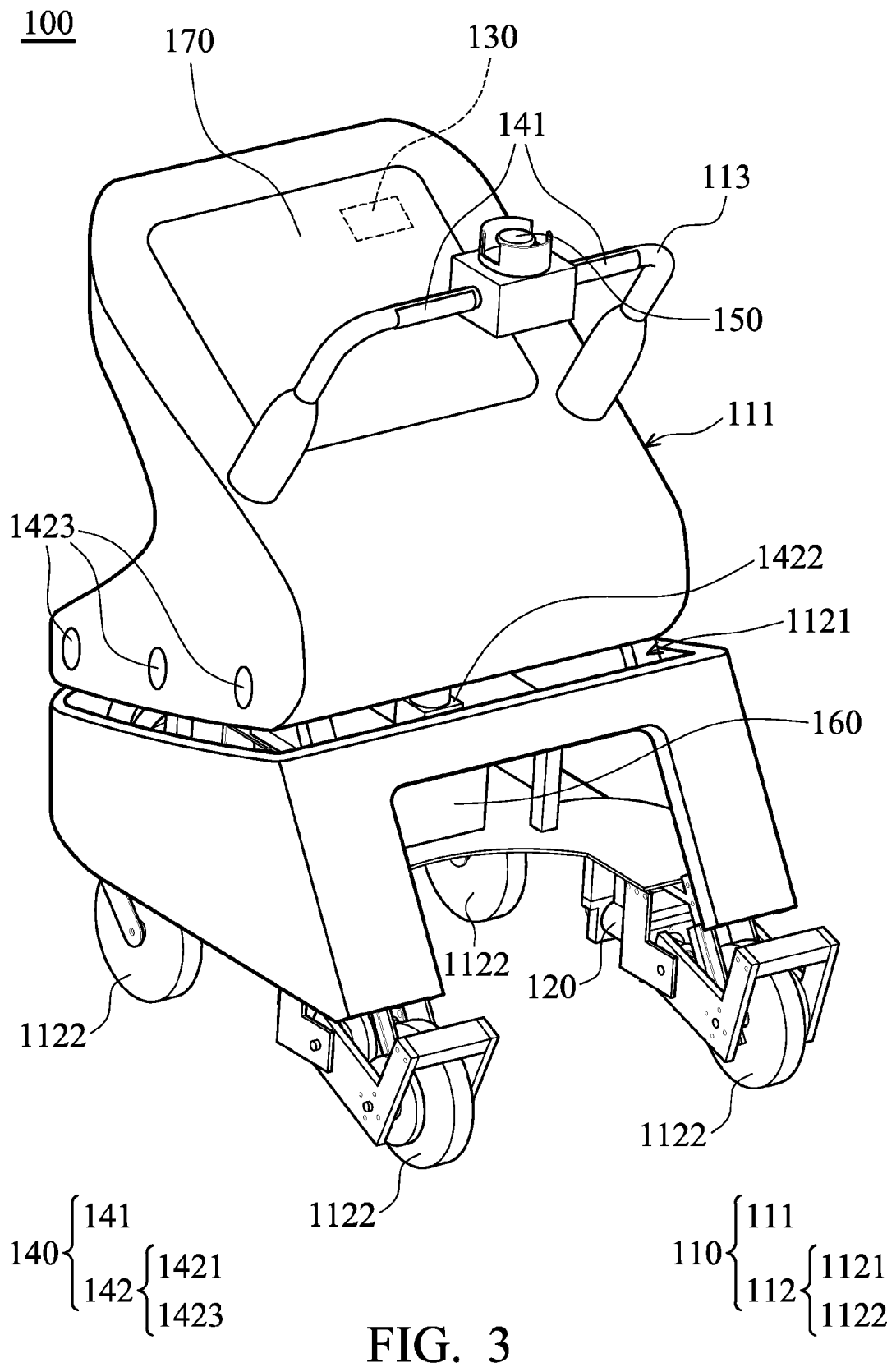
FIG. 3 is a schematic view showing a rear side of the rehabilitation device of the invention.

As shown in FIGS. 1 and 3, the moving body 110 comprises a housing 111 and a moving mechanism 112, wherein the moving mechanism 112 is composed of a supporting frame 1121 and a plurality of rollers 1122. The supporting frame 1121 is covered within the housing 111. The supporting frame 1121 is extended from the interior of the housing 111 to the exterior of the housing 111 to form a holding member 113. The rollers 1122 are disposed below the supporting frame 1121 in a rotatable manner to move the supporting frame 1121, such that the user may grab the holding member 113 and move with the movement of the rehabilitation device 100.

It should be noted that the embodiment the housing 111 consists of an upper housing and a lower housing for quick assembly of the power supply unit 160, but it is not limited thereto. The housing 111 can also be formed as a unitary piece.

Figure 2:
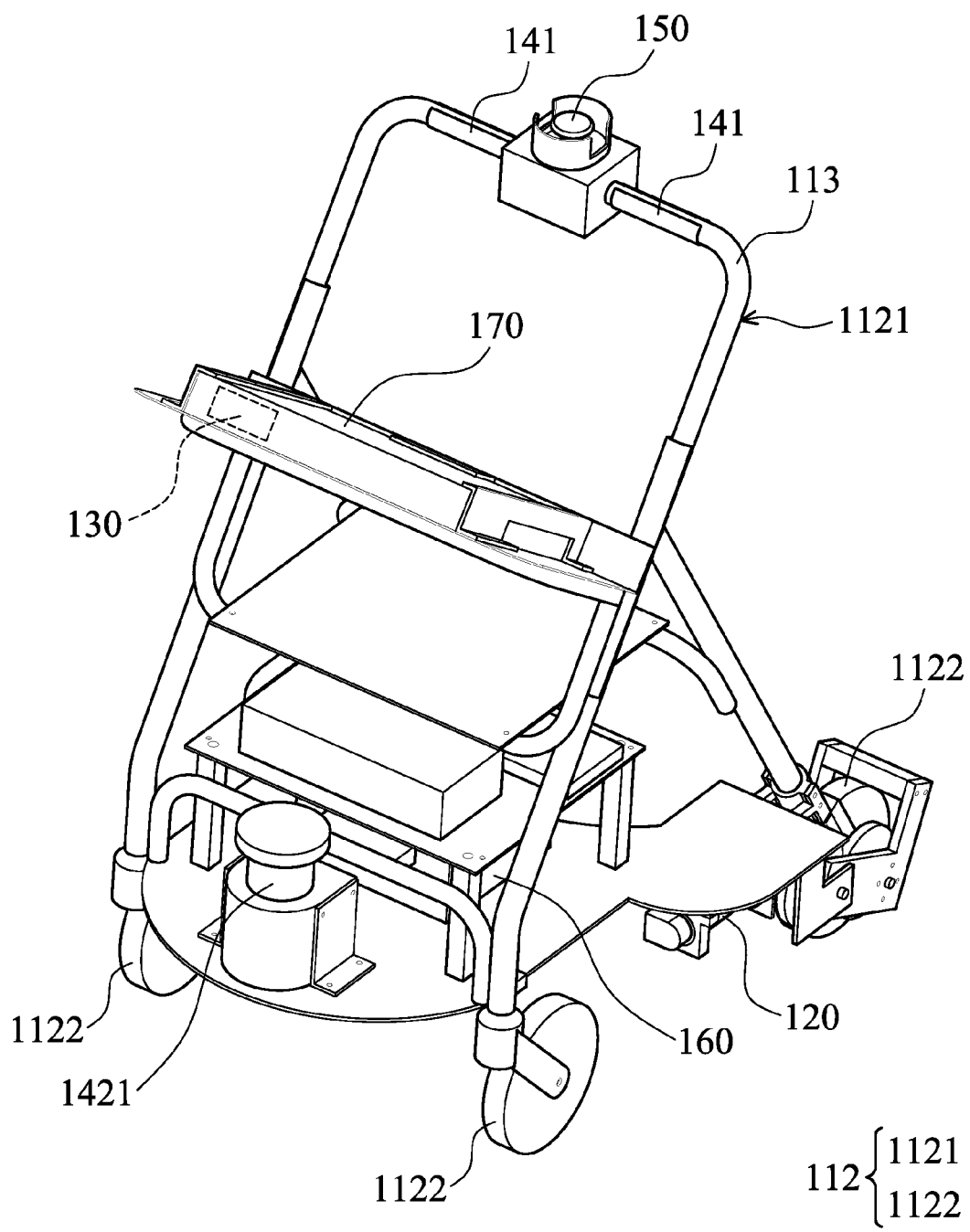
FIG. 2 is a schematic view of the rehabilitation device in FIG. 1, wherein a housing thereof is omitted.
Figure 4:
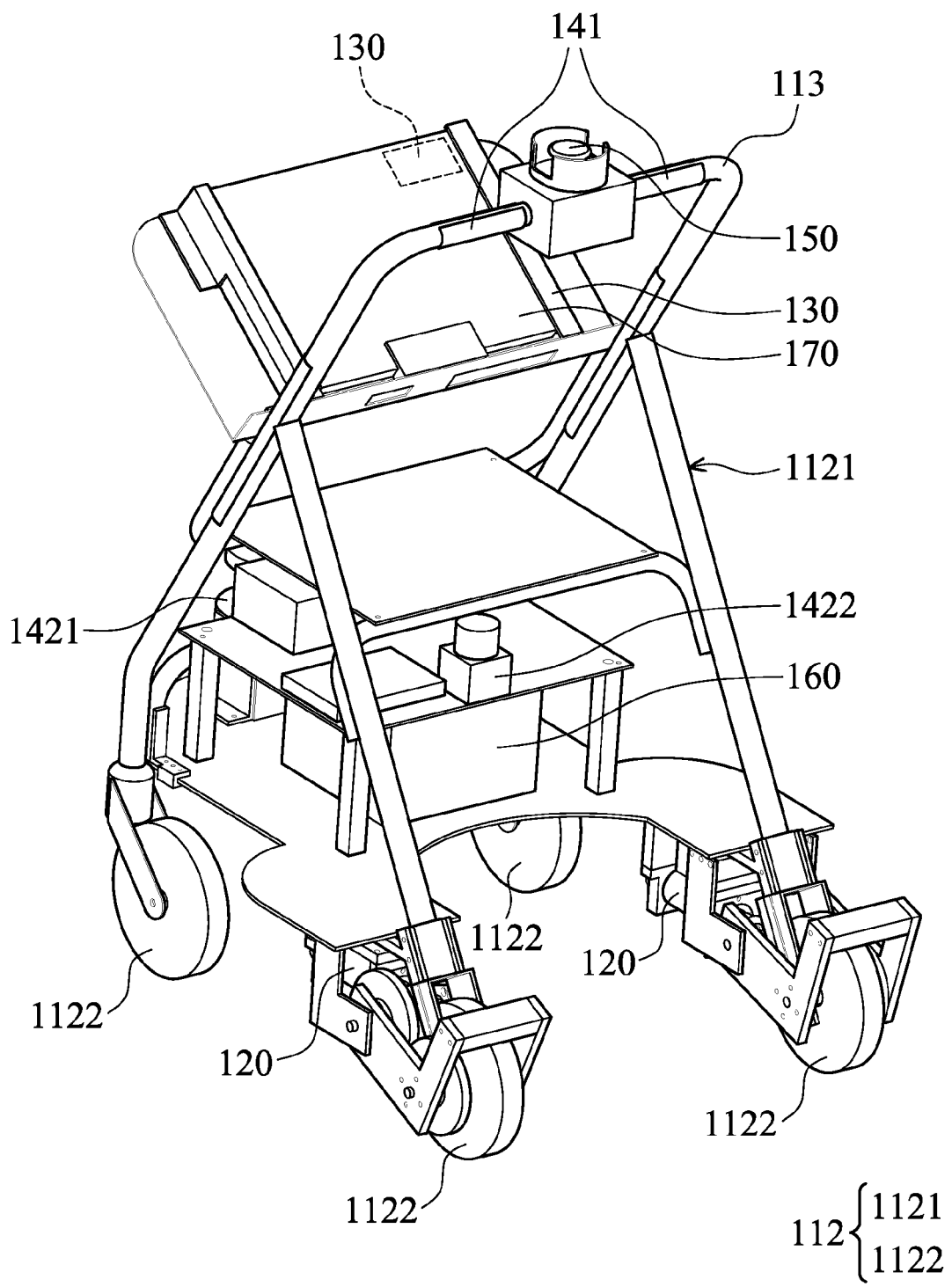
FIG. 4 is a schematic view of the rehabilitation device in FIG. 3, wherein a housing thereof is omitted.

As shown in FIGS. 2 and 4, the motor 120 and the control system 130 are disposed in the housing 111. The control system 130 is coupled to the motor 120, and the motor 120 connects with the rear rollers 1122 of the moving mechanism 112. The control system 130 sends out indications to control the operation of the motor 120, thereby moving the rollers 1122 via the transmission mechanism connected to the motor 120. In addition, the control system 130 further provides signals to the transmission mechanism to allow forward movement directions, rearward movement directions and left and right movement directions. As a result, the moving body 110 is able to move toward different directions or stop according to the signals of the control system 130.

As shown in FIG. 3, the sensor module 140 is disposed on the moving body 110 and coupled to the control system 130. The control system 130 controls the operation of the motor 120 to move the moving body 110 according to the information detected by the sensor module 140. The sensor module 140 comprises a pressure sensing unit 141 and a distance sensing unit 142.

As shown in FIG. 1 to FIG. 4, the pressure sensing unit 141 comprises two pressure detectors respectively disposed on a left portion and a right portion of the holding member 113 to detect the pressure received thereon. The distance sensing unit 140 comprises a first distance sensor 1421 (as shown in FIGS. 1 and 2), a second distance sensor 1422 (as shown in FIGS. 3 and 4) and a plurality of third distance sensors (as shown in FIGS. 1 and 3). Referring to FIGS. 1 to 4 at the same time, the first distance sensor 1421 and a second distance sensor 1422, for example laser sensors, are disposed in the housing 111, and face toward the front direction and the rear direction of the moving body 110, respectively, to detect objects in front of the moving body 110 and in back of the moving body 110. Moreover, the first distance sensor 1421 transmits data of the distance between the object (front barrier) and itself to the control system 130 to help build up or amend a site map. The third distance sensors 1423, for example, ultrasound sensors, are arranged around the front side, left side and right side of the housing 111 for subtly sensing the objects at a short distance from the moving body 110.

Furthermore, the sensor module 140 may further comprises other sensing units, such as an image sensing unit and a sonic sensing unit. The image sensing unit is disposed on the front side of the moving body 110, and the image is displayed on the operating interface 170, providing blind spot vision in front of the rehabilitation device 100. The sonic sensing unit receives sound signals. Thereby, the control system 130 drives the motor 120 according to the location of the sound signals and the built-in site map and moves the rehabilitation device 100 to the sound source. Moreover, the user may send out signals to the rehabilitation device 100 via the remote controller, and the control system 130 then drives the motor 120 according to the signals and the built-in site map and moves the rehabilitation device 100 to the signal source.

As shown in FIGS. 1 to 4, the switch member 150 is disposed on the moving body 110. In this embodiment, the switch member 150 is disposed on the holding member 113 and coupled to the power supply unit 160 in the housing 111, but it is not limited thereto. The switch member 150 can be disposed on any position of the moving body 110. The switch member 150 is utilized as a protective mechanism. During emergencies, the user may press the switch member 150 to stop the operation of the rehabilitation device 100 to prevent accidents.

Referring to FIGS. 2 and 4, the power supply unit 160 is disposed in the housing 111. The power supply unit 160 is not only coupled to the switch member 150, but is also coupled to the control system 130, providing electrical power to the control system 130.

Referring to FIGS. 3 and 4, the operating interface 170, for example a touch screen display, is mounted on the supporting frame 1121 and exposed outside of the housing 111. The operating interface 170 is coupled to the control system 130. Specifically, the control system 130 and the operating interface 170 are integrated as an electronic device. In detail, the control system 130 is built with different operating modes, such as an autonomous mode and a rehabilitation mode. The user may switch freely between the autonomous mode and the rehabilitation mode, and control the operating of the sensor module 140 via the operating interface 170.

Referring to FIG. 1 again, the illuminating apparatus 180 is disposed on the front side of the housing 111, providing illumination to the users when using the rehabilitation device 100. The illuminating apparatus 180 is coupled to the power supply unit 160 and the control system 130. In other words, the user may use a switch to operating the illuminating apparatus 180, or the user may operate the illuminating apparatus 180 via the operating interface 170.

When the control system 130 is switched to the rehabilitation mode, the pressure sensing unit 141 and the distance sensing unit 142 are turned on. The user stands at the back of the rehabilitation device 100 and grabs the pressure sensing units 141 on the holding member 113 with both hands. The pressure sensing units 141 on the left side and the right side respectively send back detected pressure values to the control system 130, such that the control system 130 may determine a direction to move for the rehabilitation device 100 according to the different pressure values or the substantially same pressure values of both hands. That is, the rehabilitation device 100 turns left, turns right or moves straight according to the detected pressure values, and the degree of turning of the rehabilitation device 100 depends on the level of the pressure values.

The first distance sensor 1421 and the third distance sensor 1423 detect objects in front of the moving body 110. The control system 130 determines the distance between the rehabilitation device 100 and the objects according to the data transmitted form the first distance sensor 1421 and the third distance sensor 1423. In detail, the first distance sensor 1421 detects objects further from the rehabilitation device 100, and the third distance sensors 1423, respectively disposed on the front side, left side and right side of the housing 111, detect objects at a short distance from the rehabilitation device 100. In particular, if an object suddenly appears in the detected range of the third distance sensors 1423, the control system 130 sends out signals to make the rehabilitation device 100 stop, or to go around the object to avoid collisions. The second distance sensor 1422 is utilized to detect the distance between the user's legs and the rehabilitation device 100 and the motion of the user's legs. When the user moves forward, the second distance sensor 1422 sends the data back to the control system 130, allowing the control system 130 to move or to stop the rehabilitation device 100 accordingly. In other words, under a normal gait mode, when the user moves forward one step, the rehabilitation device 100 also moves forward a distance corresponding to one step of the user. When the user stops, the rehabilitation device 100 also stops accordingly. Also, the control system 130 may further determine the moving speed of the rehabilitation device 100 according to the frequency of legs moving that is detected by the second distance sensor 1422 in order to achieve the step-by-step function.

Figure 5A:
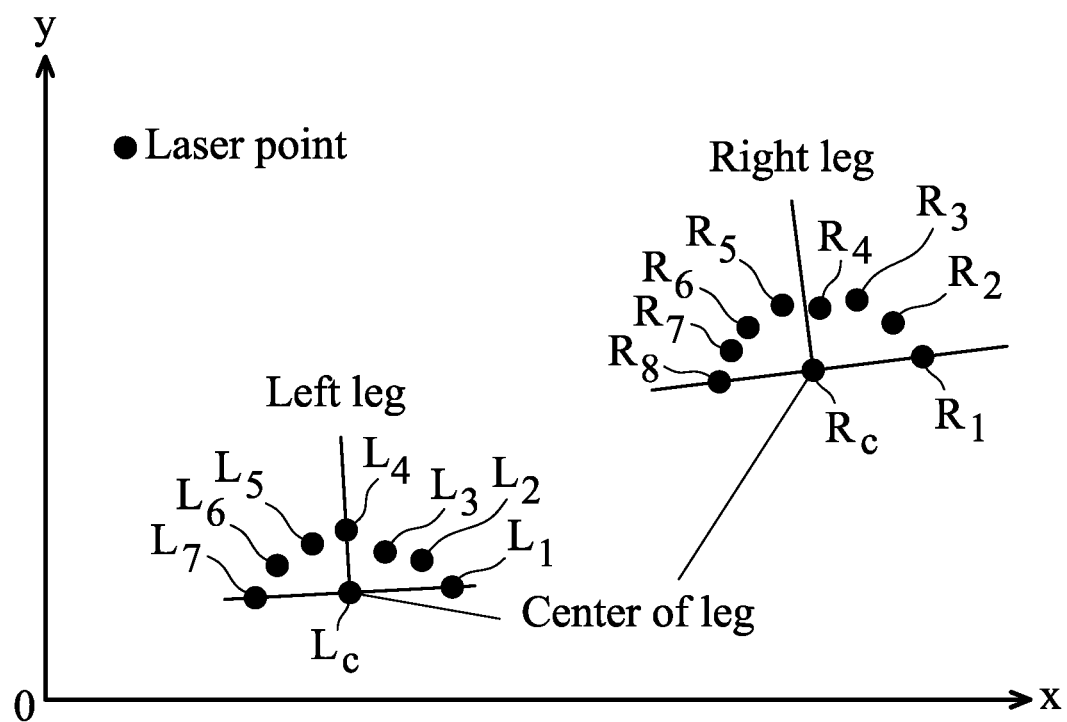
FIGS. 5A and 5B show step detection method of the embodiment of the invention.
Figure 5B:
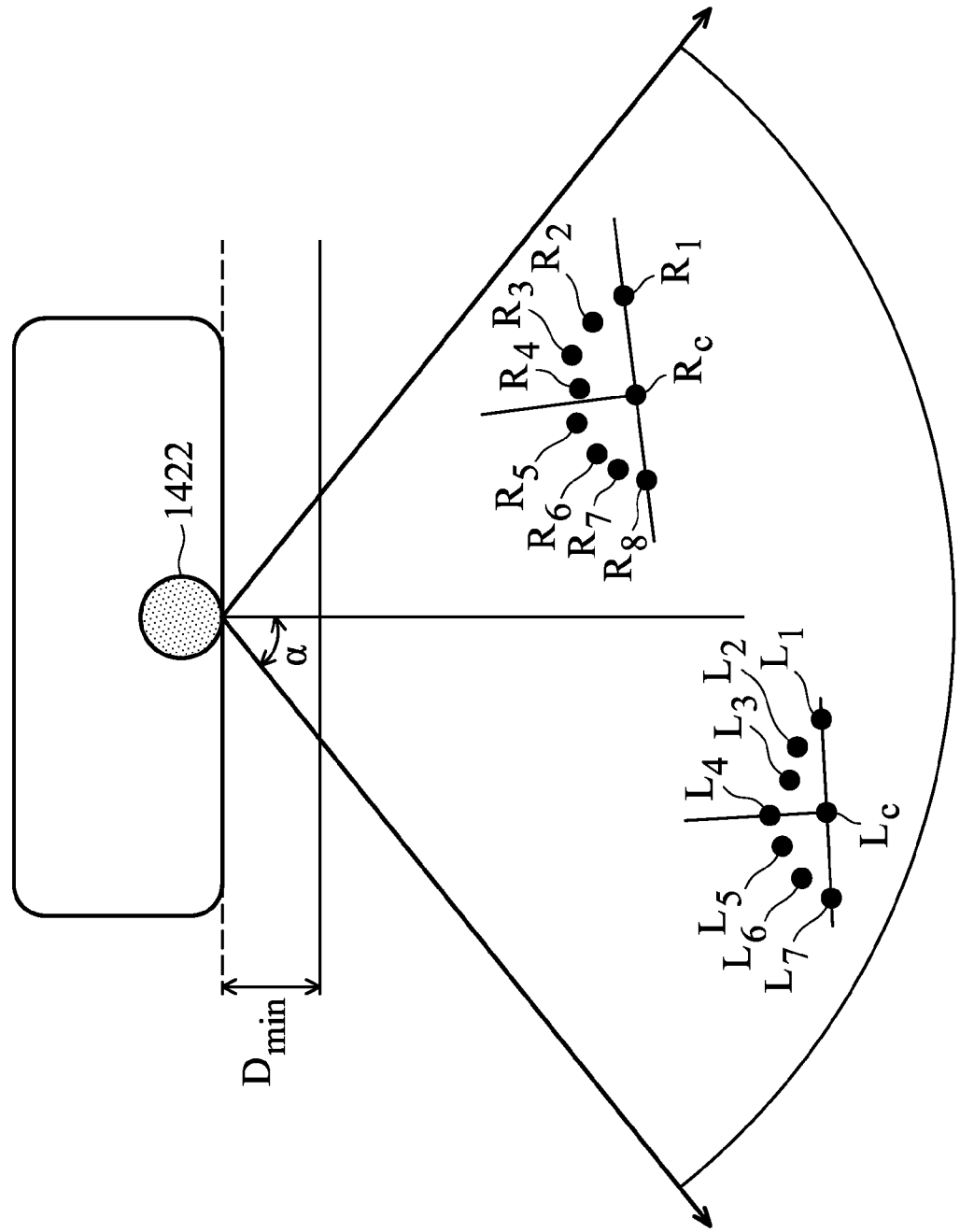

The second distance sensor 1422 can be laser sensor, which detects the motion of the user's legs by monitor the step length, velocity and acceleration of each leg in each step. With reference to FIGS. 5A and 5B, $L_{t,i}$ is the duration time of the i-th step of left leg, and similarly, $R_{t,i}$ for right leg. Note that the duration of one step counts from the time instant when one leg starts moving till the time instant when the other leg starts moving. Next, the second distance sensor 1422 is mounted on the rehabilitation, which is near the user's thighs, at about 45 cm height from the ground. Referring to the robot's odometer, we transform the detection points of the second distance sensor 1422 to the world coordinate system (FIGS. 5A and 5B). The solid dots are the laser points, and the center of leg $L_c$ is midpoint of the segment of laser points for that leg projected onto the ground. Let the laser points be denoted as $L_i, L_n$, where n is the number of the total laser points in the segment. If n is even, then the midpoint is taken to be the mean of $L_{n/2}$ and $L_{(n/2)+1}$. Let $L_{c,i}$ be the $L_c$ associated with i-th step of the left leg, and $L_{c,i,y}$ be its y coordinate. With the detection above, the step length, the movement velocity and the movement acceleration can be achieved after calculation.

In one embodiment of the invention, the moving speed and distance of the rehabilitation device in each movement is constant, for example, 300 mm/s (moving speed). The moving speed of the rehabilitation device can be modified by user.

The rehabilitation device of the embodiment of the invention can be switched between different modes according to the information collected form the pressure sensing unit 141 and the distance sensing unit 142.

For example, the Parkinson's Disease patients will walk in small steps, but they will not stop. In one embodiment of the invention, a threshold step length can be predetermined, for example, 0.3 m to 0.45 m. When the second distance sensor 1422 finds that the user walk in small steps and the step length is shorter than the threshold step length, the rehabilitation device is switched in to a Festinating Gait mode and stops from moving with the stepping motion of the user. Therefore, the Parkinson's Disease patient is protected from tumbling down.

In a modified example, a threshold distance $D_{min}$ between the user and the rehabilitation device can be predetermined. When the user approaches the rehabilitation device with small step length over the threshold distance, the rehabilitation device moves to keep the distance with the user.

Additionally, when Parkinson's Disease patients have the freezing of gait, they will grip the handle tightly and their leg's muscles get stiff. This situation may happen even when the user is still walking in normal gait, and then the next second he gets stuck. Therefore, when the pressure sensing unit 141 finds that the user grips the handle tightly, the rehabilitation device is switched in to a Freezing of Gait mode to protect the Parkinson's Disease patient from tumbling down.

When the control system 130 is switched to the autonomous mode, the pressure sensing unit 141 and the second distance sensor 1422 are turned off, and the first distance sensor 1421 and the third distance sensor 1423 are turned on for the rehabilitation device 100 to enter a stand by mode. When the user calls or presses the remote controller, the rehabilitation device 100 may determine the user's position and move to the signal source automatically according to the received signals. Furthermore, during automatic movement of the rehabilitation device 100, the control system 130 determines the moving direction and timely changes the moving path to avoid objects in the way of the user according to the datum from the first distance sensor 1421 and the third distance sensor 1423.

Additionally, the control system 130 is built with rehabilitation information that may be programmed by doctors concerning walking posture and duration of therapy exercises which may be displayed on the operating interface 170 as a reference for the user. Also, multi-media information is also built into the control system 130 which allows the user to play short films or play games via the operating interface 170.

In the rehabilitation device 100 of the invention, the sensor module 140 provides detected datum to allow the moving body 100 to move step by step with the user according to the physical information of the user (the holding pressure and the movement of the legs). The rehabilitation device 100 actively directs the user to perform continuous rehabilitation exercises. Meanwhile, running into objects is avoided and emergency stopping ability is provided. Thus, safety during the operation of the rehabilitation device 100 is increased. The rehabilitation device 100 of the invention provides a safe method to assist a user requiring rehabilitation. The rehabilitation device 100 of the invention helps users to speed up the rehabilitation process.

While the present invention has been described by way of example and in terms of preferred embodiment, it is to be understood that the present invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A rehabilitation device, comprising:
   a moving body having a housing and a moving mechanism;
   a motor disposed in the housing, connecting to the moving mechanism and driving the moving mechanism;
   a control system disposed in the housing and coupled to the motor; and
   a sensor module disposed on the moving body and coupled to the control system;
   wherein the control system controls the operation of the motor to move the moving body according to information detected by the sensor module,
   wherein the sensor module comprises a distance sensing unit disposed on the moving body,
   wherein the distance sensing unit comprises:
   a first distance sensor disposed in the housing and facing a front direction of the moving body; and
   a second distance sensor disposed in the housing and facing a rear direction of the moving body, wherein the second distance sensor detects a step length of a user and a distance between the rehabilitation device and the user, wherein when the user moves forward, the second distance sensor sends data back to the control system, allowing the control system to move or to stop the rehabilitation device accordingly,
   wherein when the step length is longer than a threshold step length, the rehabilitation device is under a normal mode, and the rehabilitation device moves step by step with the user,
   wherein when the step length is shorter than the threshold step length, the rehabilitation device is switched to a Festinating Gait mode and stops from moving with the stepping motion of the user.

2. The rehabilitation device as claimed in claim 1, wherein the moving body further comprises a holding member disposed on a back side of the housing.

3. The rehabilitation device as claimed in claim 2, wherein the sensor module further comprises a pressure sensing unit disposed on the holding member and coupled to the control system.

4. The rehabilitation device as claimed in claim 3, wherein the pressure sensing unit comprises two pressure detectors respectively disposed on a left portion and a right portion of the holding member.

5. The rehabilitation device as claimed in claim 4, wherein when the pressure sensing unit finds that the user grips the handle tightly, the rehabilitation device is switched in to a Freezing of Gait mode to protect the user from tumbling down.

6. The rehabilitation device as claimed in claim 2, further comprising a power supply unit and a switch member, wherein the power supply unit is disposed in the housing, and the switch member, coupled to the power supply unit, is disposed on the holding member.

7. The rehabilitation device as claimed in claim 1, wherein the first distance sensor and the second distance sensor are laser sensors.

8. The rehabilitation device as claimed in claim 1, wherein the distance sensing unit further comprises a plurality of third distance sensors, arranged on the front, left and right sides of the housing, respectively.

9. The rehabilitation device as claimed in claim 8, wherein the third distance sensors are ultrasound sensors.

10. The rehabilitation device as claimed in claim 1, wherein the sensor module comprises an image sensing unit disposed on a front side of the housing.

11. The rehabilitation device as claimed in claim 1, wherein the sensor module comprises a sonic sensing unit disposed on the housing.

12. The rehabilitation device as claimed in claim 1, further comprising an operating interface disposed on the housing and coupled to the control system.

13. The rehabilitation device as claimed in claim 1, further comprising an illumination apparatus disposed on a front side of the housing and coupled to the control system.

14. The rehabilitation device as claimed in claim 1, further comprising a power supply unit disposed in the housing and coupled to the control system.

15. The rehabilitation device as claimed in claim 1, further comprising a switch member disposed on the housing and coupled to the power supply unit.

16. The rehabilitation device as claimed in claim 1, wherein the moving mechanism comprises:
   a supporting frame disposed in the housing; and
   a plurality of rollers connected with the supporting frame and thereby moving the supporting frame.

17. The rehabilitation device as claimed in claim 16, wherein the supporting frame is extended from an interior of the housing to an exterior of the housing to form a holding member.

18. The rehabilitation device as claimed in claim 17, wherein the sensor module comprises a pressure sensing unit disposed on the holding member and coupled to the control system.

19. The rehabilitation device as claimed in claim 18, wherein the pressure sensing unit comprises two pressure detectors respectively disposed on a left portion and a right portion of the holding member.

20. The rehabilitation device as claimed in claim 1, wherein the threshold step length is between 0.3 m to 0.45 m.

21. The rehabilitation device as claimed in claim 1, wherein when the distance between the user and the rehabilitation device is shorter than a threshold distance, the rehabilitation device moves to keep distance with the user.

\* \* \* \* \*